United States Patent [19]
Brockway et al.

[11] 3,815,216
[45] June 11, 1974

[54] METHOD OF MANUFACTURING A THERMAL BREAK CONSTRUCTION ELEMENT

[75] Inventors: Warren H. Brockway, Newnan; Eugene J. Craven, Moreland, both of Ga.

[73] Assignee: The William L. Bonnell Company, Newnan, Ga.

[22] Filed: Oct. 12, 1972

[21] Appl. No.: 297,057

[52] U.S. Cl............. 29/460, 29/527.1, 29/DIG. 29, 52/309, 52/403
[51] Int. Cl............................................. B23p 11/00
[58] Field of Search........ 49/400, 404; 52/309, 400, 52/403; 29/428, 460, 527.1, DIG. 47, DIG. 29

[56] References Cited
UNITED STATES PATENTS

| | | | |
|---|---|---|---|
| 3,093,217 | 6/1963 | Doede | 52/206 |
| 3,332,170 | 7/1967 | Bangs | 49/400 |
| 3,411,254 | 11/1968 | Kessler | 52/403 X |
| 3,420,026 | 1/1969 | Nolan | 52/403 |
| 3,466,801 | 9/1969 | Bohn | 49/404 |
| 3,487,580 | 1/1970 | Holliday | 52/403 X |
| 3,517,472 | 6/1970 | Toth | 52/309 X |
| 3,600,857 | 8/1971 | LaBarge et al. | 49/404 |

Primary Examiner—Charles W. Lanham
Assistant Examiner—D. C. Reiley, III
Attorney, Agent, or Firm—Donald L. Johnson; John F. Sieberth; Paul H. Leonard

[57] ABSTRACT

A method of manufacturing a combination metal and plastic linear construction element or shape, wherein in a continuous operation, a metal extrusion is made containing a removable section, the removable section is removed while the remainder of the extrusion is held in place substantially as originally extruded, and a plastic thermal break is extruded and inserted in the metal extrusion, thereby forming a unitary or integral linear shape comprising two metal members and a plastic member, with the plastic member retaining the metal members in spaced apart relationship and forming an insulating barrier or thermal break between the metal elements.

5 Claims, 4 Drawing Figures

PATENTED JUN 11 1974 3,815,216

METHOD OF MANUFACTURING A THERMAL BREAK CONSTRUCTION ELEMENT

BACKGROUND OF THE INVENTION

The present invention relates to a novel composite or unitary construction element having a thermal barrier or break and more particularly to an element of the type which may be used in window construction for frames and/or sashes.

The invention generally relates to thermally insulated windows and similar panel assemblies for installation in an opening of an enclosing wall exposed to different temperatures at the opposite sides thereof.

This invention especially relates to a method of making a plastic thermo-break for heat conductive elements and a unique means for joining two metal members into a relatively rigid structure, while providing at the same time thermal insulation between them to reduce heat transfer between the elements.

One common situation in which the problem arises is in the manufacture and construction of aluminum windows wherein the window main frame is made in two sections, an inner and an outer one. The two sections are joined by a plastic extrusion which serves both to lock them together mechanically and provides a thermal break which lowers the rate of heat transmission from the warm interior to the cold exterior and also serves to reduce condensation on the interior of the window frame. In present practice, after the plastic strip is inserted to lock the two sections of the window, the window is put through a normal paint line, which includes a run through a heating oven. This subjects the plastic to sufficient heat to cause most plastics of the type used for this purpose to shrink and thus ruin the bond between the plastic and the aluminum, causing a high rejection rate. The same problem can occur in any situation where two metal pieces are bonded with a heat-insulating plastic member.

A variety of means have been developed to overcome the foregoing problems. U.S. Pat. No. 3,411,254 is representative of one type of plastic thermo-break and utilizes a plastic locking strip which contains a heat actuated blowing agent. After assembly of the two metal units and the plastic strip, the assembly is heated to expand the plastic into tight engagement with the two metal members.

Other types of thermal barrier or thermal break constructions are illustrated by U.S. Pat. Nos. 2,835,360; 3,093,217; 3,099,337; 3,114,179; 3,289,377; 3,332,170; 3,393,487; 3,420,026; 3,436,884; 3,487,580; 3,517,472; and 3,600,857. Varying degrees of success have been achieved using these prior art constructions.

Prior art metal construction elements or linear shapes of the present invention are generally of two types. In one type, a one-piece shape is made of extruded or rolled metal. The metal is an excellent conductor and permits easy transfer of heat and cold. In cold weather, condensation or frost frequently forms on the shape when such shapes are exposed to exterior and interior climate conditions. Such one-piece shapes also do not dampen noise and have many other disadvantages. The other type of construction element in which some degree of success has been achieved, is one of multiple shapes or sections, which upon assembly have a linear length of an insulating barrier between the shapes. The insulating barrier is adhesively attached or mechanically fastened to the multiple metal members.

The present invention has a number of advantages over these prior art constructions. The invention eliminates the necessity for using two or more pieces and eliminates the handling of multiple pieces through normal finishing operations such as painting, anodizing and other manufacturing and assembly steps.

The instant invention provides an insulating barrier which is an integral part of a one-piece metal member thus eliminating the need for mechanically bonding a plurality of shapes.

Using the method of this invention, the problem of alignment of multiple pieces is eliminated.

The present invention also provides for an insulating barrier which is formed or connected in such manner that bonding failure, slipping out of position and the like are prevented.

An object of this invention is to provide an improved linear construction element having a thermal break or insulating barrier therein, which can be readily and easily manufactured.

Another object is to utilize plastic materials such as polyvinylchloride, polyethylene, polystyrene, polyurethane, foamed plastic materials, or the like, as an insulating barrier when required with extruded or rolled metal members or shapes.

Other objects and advantages of the present invention will become more readily apparent from a consideration of the description and drawings hereinafter.

SUMMARY OF THE INVENTION

The instant invention relates to a method of making or manufacturing unitary or integral thermal break linear construction elements or shapes. The method comprises the principal steps as follows: (1) a metal member is extruded in the usual manner into a desired shape with the extrusion designed to include a small section or "tear-out" part at a location where an insulating barrier is desired; (2) the "tear-out" part is then mechanically removed from the extrusion or linear shape, with the metal members from which the part has been removed being maintained in substantially the same relationship they had prior to the part being removed therefrom; (3) after the "tear-out" part has been removed, the metal members while being maintained in their spaced apart relationship are moved into a plastic extruder or other suitable device and a preselected plastic material is placed into the void formed by the removal of the tear out. The plastic material is then permitted to set or cool thereby forming a unitary linear metal shape with an insulating barrier or thermal break firmly secured therein.

BRIEF DESCRIPTION OF THE DRAWINGS

The invention will be more readily understood from a reading of the specification hereinafter and by reference to the accompanying drawings forming a part thereof, wherein an example of the invention is shown, and wherein.

DESCRIPTION OF THE PREFERRED EMBODIMENT

Figure 2:
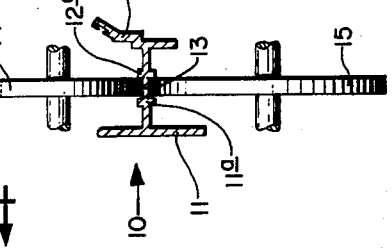
FIG. 2 is a view along line 2—2 of FIG. 1 and illustrates one embodiment of an extruded metal member of this invention, with the tear-out or removable section in place.

Referring now to the drawings wherein like characters of reference designate like parts throughout the several views, and more particularly to FIG. 2, a metal construction element of the type used in the construction of window frames is illustrated at 10 and is shown just after the element 10 has been formed by extrusion in the normal or customary manner. The member 10 comprises three principal parts, side members 11 and 12 and a tear-out or removable section 13. The member 10 is preferably an aluminum extrusion and the term "aluminum" as used herein includes aluminum and aluminum alloys customarily used or suitable for forming construction elements. The member 10 may be of any desired or predetermined shape or size and a typical shape is usually extruded in lengths ranging from 16 feet to 26 feet. Shorter or longer lengths may be used as desired, depending upon the particular need and the type of extrusion equipment and other apparatus available. Aluminum stock is fed through a die of any desired configuration to form the initial extruded construction element. Such extrusions in various sizes, shapes and configurations are especially suitable in making windows, doors, and frames therefor.

It can be appreciated that the removal section 13 may be of any suitable shape or size, but is preferably of a minimal thickness so as to enhance the ease in which it can later be removed. It is also preferably of a width which corresponds to the width of the plastic insulation or thermal barrier to be subsequently inserted into the member 10.

After the member 10 has been formed, it is moved forward on a table or the like and driven by suitable drive rollers 14 and 15 to the next operation. The shape or element 10 is fed into a jig or fixture that holds the shape 10 in a somewhat rigid position and within desired tolerances, but yet loose enough so that it can be moved forward by means of power driven drive or feeder rollers 14 and 15. Preferably, the feeder rolls contact only the "tear-out" portion 13 of the extrusion 10. The drive rollers may have teeth thereon which contact the tear-out section 13 and drive the element 10 forward. This arrangement which can be seen in FIG. 1 as well as FIG. 3, eliminates marring or damage to the sides 11 and 12 during the handling or processing of the member 10. Additional sets of drive rollers may be placed ahead of the drive rollers 14 and 15 as desired or necessary to handle various lengths of extruded members 10.

Figure 3:
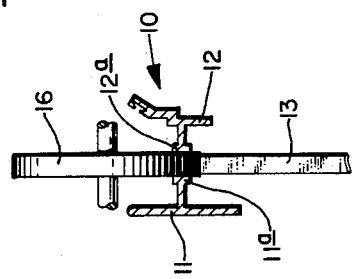
FIG. 3 is a view along line 3—3 of FIG. 1 and shows the extruded metal member of this invention, immediately after the tear-out section has been removed, thus dividing the metal member into two separate members.

In FIG. 3, the member 10 is shown wherein the removable section 13 has been removed from the sides 11 and 12.

Figure 1:
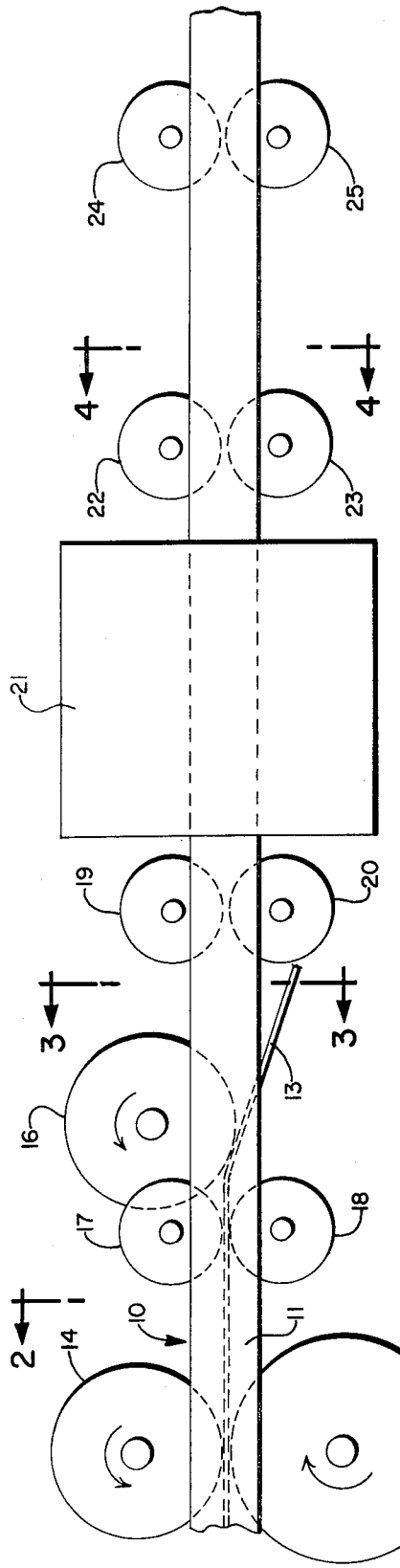
FIG. 1 is a side view of an extrusion process representing the method of the present invention.

The member 13 has been removed from the sides 11 and 12 by a pinch roller 16 or the like. As the section 13 is removed, it is simultaneously directed downwardly away from the barrier making process where it may be collected as desired. As best seen in FIG. 1, guide rollers 17, 18 and 19, 20 retain the sides 10 and 11 in a desired position before and after the section 13 is removed. Additional guide rollers may be employed as necessary or desired.

After the section 13 has been removed, the members 11 and 12 are guided into a cross-head plastic extruder 21 or similar device wherein an insulation material is inserted into the void between the sides 11 and 12 created by the removal of the "tear-out" section 13.

A wide variety of plastic materials are suitable for forming the thermal barrier, including polyvinylchloride, polyethylene, polystyrene, urethane and the like. Foamed plastic materials are particularly preferred. Cooling apparatus may be necessary for some types of plastic and such can be installed at a convenient location after the plastic has been inserted into the space between the sides 11 and 12.

Guide rollers 22, 23 and 24, 25 are positioned at suitable locations after the plastic insertion operation has been completed. Additional guide rollers may be used as desired or required. The guide rollers or glides are desirably equipped with adjustable bearings affixed to the table or bed and in a series both ahead of and behind the cross-head 21. These glides or guide rolls hold the extrusion members 10 and 11 in alignment after the pinch roll 16 has removed the tear-out section 13. Forward motion is continued as long as a piece or element 10 is coming through behind a previous one.

Figure 4:
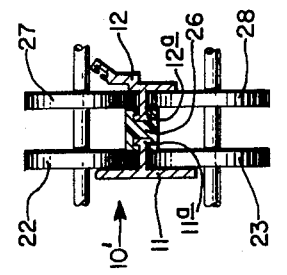
FIG. 4 is a view along line 4—4 of FIG. 1 and illustrates the unitary construction element of this invention wherein the plastic insulation or thermal barrier has been inserted in the void formed by the removal of the tear-out section.

In FIG. 4, the unitary thermal break element 10' is seen after the insulation or plastic insert 26 has been inserted between the sides 11 and 12 and is firmly in position. The guide rollers 22 and 23 retain the side 11 in alignment and the guide rollers 27 and 28 retain the side 12 in alignment during processing. The number of glides or guide rollers 22, 23, 24, 25, necessary on the off end of the bed is largely determined by the length of time that is necessary for the plastic or insulating barrier to harden or set to a desired firmness. In one mode of cooling a water box may be installed on the bed after the cross-head or plastic extruder 21, which will effect a rapid set of the plastic.

The glides and guide rollers may be mounted in various positions on the bed so that pre-painted or pre-anodized materials may be run through the processing equipment. This improves the flexibility of the process and provides a further improvement over prior art methods.

In a preferred embodiment of the invention as shown in the drawings, the member 10 is formed so that the sides 11 and 12 have internal projections, knobs or feet 11a and 12a, respectively formed thereon. This enables the plastic 26 to be inserted not only in the void between the feet 11a and 12a, but also to surround them, as best seen in FIG. 4, to aid in firmly affixing the plastic insulating barrier 13 on the sides 11 and 12 to form the unitary construction element 10'.

It can be appreciated that various changes may be made in the design of the metal construction element and the type of insulating barrier inserted therein without departing from the spirit of the invention and within the scope of the appended claims.

What is claimed is:

1. A method of making a thermal break linear construction element, comprising the steps of:

1. introducing an extruded metal member having a readily removable interior section therein into a means for removing said interior section;
2. removing said interior section from said extruded metal member and forming separate spaced apart metal members while maintaining said separate spaced apart metal members in substantially the same relationship they had prior to being separated;
3. introducing the spaced apart metal members into a means for inserting a plastic material therebetween; and,
4. inserting the plastic material between the spaced apart metal members thereby joining the metal members together to form a unitary thermal break linear construction element comprising metal members separated by a plastic insulating barrier.

2. The method of claim 1, wherein each of the steps is carried out in a continuous operation.

3. The method of claim 1, wherein drive means are provided for engaging the removable section of the extruded metal member prior to said section being removed and for moving the metal members through the successive operating steps.

4. The method of claim 1, wherein the metal extrusion member is so formed that upon removal of the removable section each of the separated metal members has internal projections thereon which are adapted to receive the plastic material therearound.

5. The method of claim 1, wherein cooling means are provided for cooling the plastic material after it has been inserted between the separated metal members.

* * * * *